United States Patent
Iacono et al.

(10) Patent No.: US 7,313,409 B2
(45) Date of Patent: Dec. 25, 2007

(54) METHOD AND APPARATUS FOR TRANSMIT POWER CONTROL DURING BEAM SWITCHING

(75) Inventors: Ana Lucia Iacono, Garden City, NY (US); Janet Stern-Berkowitz, Little Neck, NY (US); Timothy A. Axness, Collegeville, PA (US); Kambiz Casey Zangi, Chapel Hill, NC (US)

(73) Assignee: InterDigital Technology Corporation, Wilmington, DE (US)

( * ) Notice: Subject to any disclaimer, the term of this patent is extended or adjusted under 35 U.S.C. 154(b) by 294 days.

(21) Appl. No.: 11/018,998

(22) Filed: Dec. 22, 2004

(65) Prior Publication Data
US 2005/0197149 A1 Sep. 8, 2005

Related U.S. Application Data

(60) Provisional application No. 60/542,761, filed on Feb. 6, 2004.

(51) Int. Cl.
*H04Q 7/20* (2006.01)
(52) U.S. Cl. ............... 455/522; 455/92; 455/562.1; 343/777; 343/751; 342/367
(58) Field of Classification Search ............ 455/522, 455/101, 562.1, 452.2, 513, 501, 424, 69, 455/442, 425, 436, 561, 438, 67.11, 422.1, 455/456.5, 456.6, 550.1, 575.1, 13.3, 65, 455/506, 92, 278.1, 575.7; 375/130, 147, 375/358, 135, 349; 370/334, 252, 335, 332, 370/333, 468, 425, 342, 347, 464; 342/367, 342/188, 164, 146, 374; 343/751, 777, 745, 343/893, 853

See application file for complete search history.

(56) References Cited

U.S. PATENT DOCUMENTS

| 6,289,217 | B1 | 9/2001 | Hamalainen et al. |
| 6,639,934 | B1 * | 10/2003 | Engstrom et al. ............ 375/130 |
| 7,065,383 | B1 * | 6/2006 | Hovers et al. ............ 455/562.1 |
| 2001/0022557 | A1 * | 9/2001 | Rouphael et al. ............ 342/367 |
| 2002/0077141 | A1 * | 6/2002 | Hwang et al. ............... 455/522 |

(Continued)

FOREIGN PATENT DOCUMENTS

DE 1233639 * 8/2002

(Continued)

*Primary Examiner*—Edward F. Urban
*Assistant Examiner*—Charles Chow
(74) *Attorney, Agent, or Firm*—Volpe and Koenig, P.C.

(57) ABSTRACT

A method and apparatus for transmit power control (TPC) while switching a beam among a plurality of beams in a wireless communication system. An antenna array generates a plurality of directional beams and preferably an omni-directional pattern and switches a beam among the plurality of beams preferably including the omni-directional pattern. Link quality on at least one of the plurality of beams is measured, and a beam having a greatest link quality is selected. If the selected beam is different from a current beam, a beam is switched from the current beam to the selected beam. While switching a beam, TPC parameters are adjusted based on the link quality difference between the link quality of the current beam and the link quality of the selected beam, and optionally, base on other parameters.

18 Claims, 2 Drawing Sheets

U.S. PATENT DOCUMENTS

2002/0142632 A1* 10/2002 Moore .................... 439/95
2002/0146983 A1* 10/2002 Scherzer et al. .......... 455/67.1
2002/0150065 A1* 10/2002 Ponnekanti ............... 370/334
2005/0136963 A1*  6/2005 Frank et al. ............. 455/522
2005/0215261 A1*  9/2005 Cha et al. ............... 455/452.2

FOREIGN PATENT DOCUMENTS

EP          1233639          8/2002

* cited by examiner

METHOD AND APPARATUS FOR TRANSMIT POWER CONTROL DURING BEAM SWITCHING

CROSS REFERENCE TO RELATED APPLICATION

This application claims the benefit of U.S. Provisional Application No. 60/542,761 filed Feb. 6, 2004, which is incorporated by reference as if fully set forth.

FIELD OF INVENTION

The present invention is related to a wireless communication system. More particularly, the present invention is a method and apparatus for transmit power control during beam switching.

BACKGROUND

System capacity is one of the most important issues in wireless communication systems. In order to increase the capacity of wireless communication systems, antenna arrays, (also known as smart antennas), have been developed. Smart antennas use multiple antennas on a communication unit, such as a wireless transmit/receive unit (WTRU), a base station, or an access point. Many different techniques have also been developed to optimize the performance of the smart antennas. One example of such a technique is beam switching.

A switched beam antenna system is a system where a plurality of fixed beams are defined, and the system selects a particular beam for transmission and reception among a plurality of beams. In selecting a particular beam, the system frequently measures each beam, and selects the beam which provides the best link quality. This measurement could be signal-to-interference ratio (SIR), signal strength indicator (RSSI) or some other measurement that reflects the link quality.

The transmit power control (TPC) is another important concern in wireless communication systems. The objective of power control is to guarantee that a minimum power is received and a maximum power is not exceeded. In a CDMA system, for example, in a reverse link (uplink), a wireless communication system uses a power control to minimize the near-far problem by assuring that all WTRUs achieve the same received power levels at a base station. In the forward link (downlink), power control is used to reduce intra-cell and inter-cell interference. Power control in the uplink also helps the WTRU to optimize battery consumption.

Transmit power is usually initialized to some value while making assumptions regarding the channel conditions. A power control algorithm is then implemented to make any necessary adjustments to reflect the actual channel condition. Several iterations may take place before the transmit power converges to a desired value.

TPC can be either open loop power control or closed loop power control. In the case of open loop power control, a transmitting terminal decides the transmit power based on its own measurements, while in the case of closed loop power control algorithm, the receiving terminal sends feedback to the transmitting terminal in order to adjust the transmit power of the transmitting terminal.

Closed loop power control usually comprises an inner loop power control and an outer loop power control. The inner loop power control makes a decision on whether the receiving terminal should ask a transmitting terminal to increase or decrease the transmit power. For example, in a cdma2000 system, this decision is based on the measured Eb/Nt and the Eb/Nt set-point (target Eb/Nt); in a W-CDMA system, this decision is based on the measured SIR and SIR set-point (SIR target). The outer loop power control is responsible for determining and adjusting the set-point values (i.e., the target Eb/Nt for cdma2000 and the target SIR for W-CDMA).

The WTRU chooses the initial set-point values based on the Quality of Service (QoS) requirements provided by the network (e.g., target frame error rate (FER) for cdma2000 and target block error rate (BLER) for W-CDMA) and other factors. The target set point is then adjusted up or down by the WTRU based on the measured QoS. After several iterations of the inner and outer loop power control, the transmit power converges to a desired value.

As a WTRU moves around and the channel condition changes, the TPC algorithm constantly re-evaluates the received QoS and makes the necessary adjustments. When multiple antenna beams are used by a WTRU, the WTRU measures the link quality using at least one of the plurality of beams. The WTRU then chooses the best beam for reception and transmission. As the WTRU switches from the current beam to a new beam having a better quality, the switching of the beam causes an abrupt change of in the QoS.

When the TPC had converged to an optimum value with the previous beam, the transmit power of the new beam may be too high, therefore cause a near-far problem and decreasing performance of the wireless communication system.

SUMMARY

The present invention is related to a method and apparatus for TPC while switching a beam among a plurality of beams in a wireless communication system. An antenna array generates a plurality of directional beams and switches a beam among the plurality of beams. The link quality on at least one of the plurality of beams is measured, and the beam having the best link quality is selected. If the selected beam is different from the current beam, the beam is switched from the current beam to the selected beam. While switching a beam, TPC parameters are adjusted based on the link quality difference between the link quality of the current beam and the link quality of the selected beam, and optionally, based on other parameters.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment. When referred to hereafter, the terminology "base station" includes but is not limited to a Node-B, a site controller, an access point or any other type of interfacing device in a wireless environment.

The present invention is applicable to any wireless communication systems including, but not limited to, cellular systems, mobile systems, wireless LANS, MANS, and PANS, fixed access systems, and ad-hoc/mesh networks. The present invention is applicable to any wireless communication standards including, but not limited to, 1G through 3G cellular systems (AMPS, IS-136, GSM/GPRS/EDGE, IS-95, CDMA2000, UMTS FDD/TDD) and the 802.xx family (802.11a/b/g, 802.16, 802.15). The present invention is applicable to both an uplink and downlink power control and both an open loop and closed loop power control.

Figure 1:
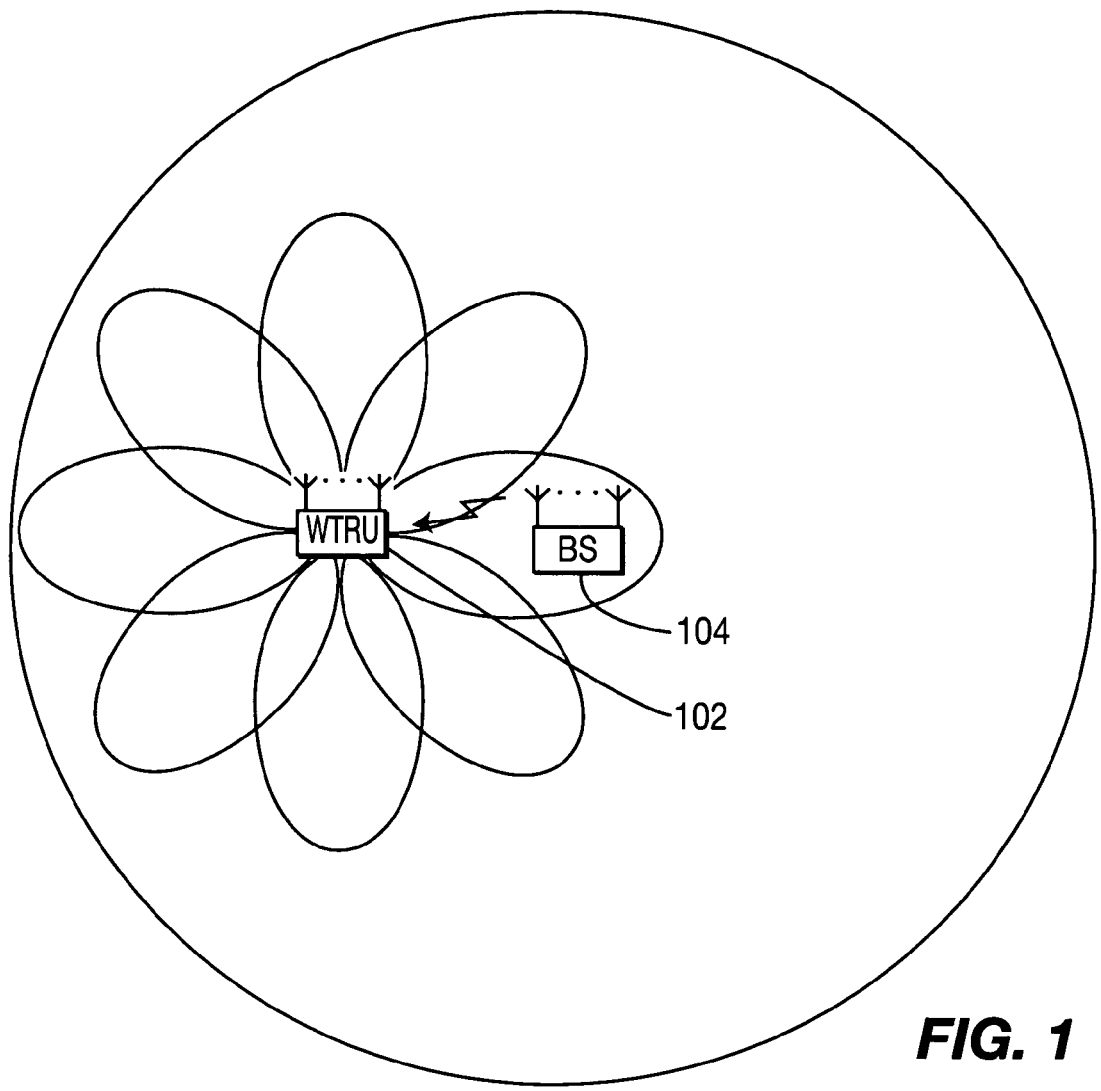
FIG. 1 shows transmission and reception using a multi-beam antenna while switching a beam direction in accordance with the present invention.

FIG. 1 shows transmission and reception of messages between a WTRU 102 and a base station 104, wherein the WTRU 102 is using a multi-beam antenna while switching the beam direction. A WTRU 102 may use a directional beam, an omni-directional pattern, or both. Likewise, a base station 104 may also use a directional beam, an omni-directional pattern, or both. For simplicity, hereinafter, the present invention will be explained with reference to the case that a WTRU 102 uses a directional beams and a base station 104 uses an omni-directional pattern as shown in FIG. 1.

The WTRU 102 is equipped with a multi-beam antenna to generate multiple directional beams preferably in addition to an omni-directional pattern and switches a beam among the plurality of beams including the omni-directional pattern. For simplicity, when referring to both the directional beams and the omni-directional pattern, reference will be made hereinafter to the term "beams". Typically, the WTRU 102 is able to receive signals from the base station 104 on more than one beam due to multi-path propagation. The WTRU 102 measures the link quality on at least one of the plurality of beams and selects a beam providing the best quality.

The link quality can be estimated based on any measurements which are related to quality of channel between a transmitter and a receiver, such as Eb/Nt, received signal strength indicator (RSSI), SIR or any other relevant measurements. In switching beams, the WTRU 102 adjusts a transmit power in the new beam and adjusts measurements and/or set point values based on the difference of link quality between the old beam and the new beam, which will be explained in detail hereinafter.

Figure 2:
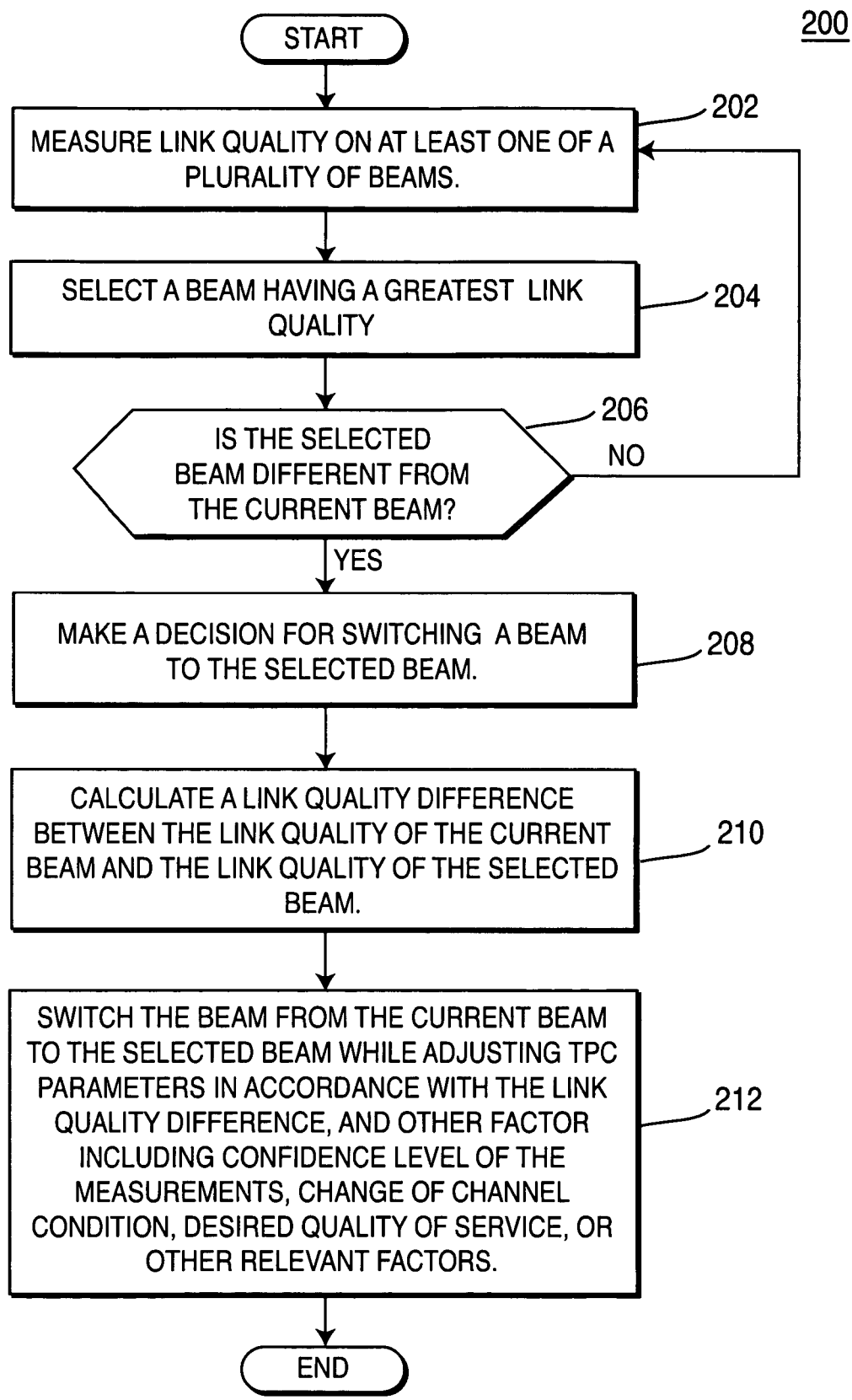
FIG. 2 is a flow diagram of a process for controlling a transmit power during beam switching in accordance with the present invention.

FIG. 2 is a flow diagram of an example of a process 200 for controlling transmit power during beam switching in accordance with the present invention. A WTRU measures the link quality on signals received via at least one of a plurality of beams (step 202). The WTRU compares the link quality and selects the beam having a highest link quality (step 204). The WTRU then determines whether the selected beam is different from the beam currently in use for communicating with a serving base station (step 206). The WTRU makes a decision for switching a beam if the selected beam is different from the current beam (step 208). If the selected beam is same to the current beam, no action is required and the process 200 returns to step 202 for another measurement, periodic or non-periodic, of link quality.

If the WTRU makes a decision to switch a beam at step 208, the WTRU calculates the link quality difference between the link quality of the current beam and the link quality of the selected beam (step 210). The WTRU then switches the beam from the current beam to the selected beam while adjusting TPC parameters in accordance with the link quality difference and, optionally, based on some other factors (step 212).

In open loop power control, a new transmit power is typically directly determined based on the link quality difference between the old beam and the new beam. Optionally, several factors may be further taken into account when adjusting the transmit power of the new beam. The factors include, but are not limited to, a confidence level of the measurements, knowledge of the change in the channel, the magnitude of the link quality difference and the desired Quality of Service (QoS).

For example, if the link quality in the new beam is X dB better than the old beam, then the transmit power may be decreased X dB in the new beam. If the channel condition is known in advance, the transmit power may be further adjusted accordingly. If the desired QoS was achieved in the old beam, then when switching to a new beam, (where the reception is potentially better), the WTRU can decrease the transmit power while maintaining the desired QoS. In this way, the transmit power of the WTRU is saved. However, if the desired QoS was not being achieved in the old beam, then after the WTRU switches to a new beam, the WTRU evaluates the new channel condition and determines the power required to achieve the desired QoS. This evaluation is based on the link quality difference, QoS achieved in the old beam, and the desired QoS. Several factors may be combined with or without weighing of a particular factor(s).

The present invention is also applied to closed loop power control. The goal is to have the downlink (DL) power control react quickly to reflect the beam change and adjust the DL power accordingly. Switching of the beam direction in a WTRU will likely cause an abrupt change of link quality in the WTRU. When the WTRU switches to a new beam having a better link quality, the DL power will likely be too high. Unnecessarily high DL power is a waste of system capacity and could lead to a reduction in data rate allocated to the WTRU. Therefore, TPC parameters are adjusted such that the closed loop power control mechanism reacts as quickly as possible to reflect the change of the beam and, therefore, adjust the transmit power to an optimum level more rapidly.

The adjusted TPC parameters for the closed loop power control include, but are not limited to, adjustment of set-points and adjustment of long term measurements. The set-points are target link quality which is a basis for generating a TPC command, such as Eb/Nt target in CDMA2000 and SIR target in W-CDMA. The adjustment of long term measurements includes adjustment of accumulated link quality measurement, (such as Eb/Nt, RSSI, or SIR), or accumulated QoS measurement, (such as FER, or BLER).

In order to improve re-convergence of inner loop power control, an accumulated link quality measurement is reset when switching a beam. For the inner loop power control, a link quality estimate on at least one of the plurality of beams is accumulated over a predetermined period of time in order to avoid too frequent transmit power adjustments. By resetting the accumulated link quality measurement, and by starting a new link quality measurement on a new beam before making a decision to send a TPC command to a base station, it is possible for an inner loop power control to reflect the switch of the beam more rapidly.

To improve re-convergence of outer loop power control, set-point and/or a long term QoS measurements may be adjusted. After the WTRU calculates a link quality estimate, the WTRU compares the link quality estimate to the link quality target, and generates a TPC command based on the result of the comparison. If the link quality estimate is lower than the target, the WTRU generates a TPC command to increase the transmit power level at the base station, and if the link quality estimate is greater than the target, the WTRU generates a TPC command to decrease the transmit power level at the base station. By adjusting the link quality target, the outer loop power control may react more rapidly to the change of the beam direction.

Figure 3:
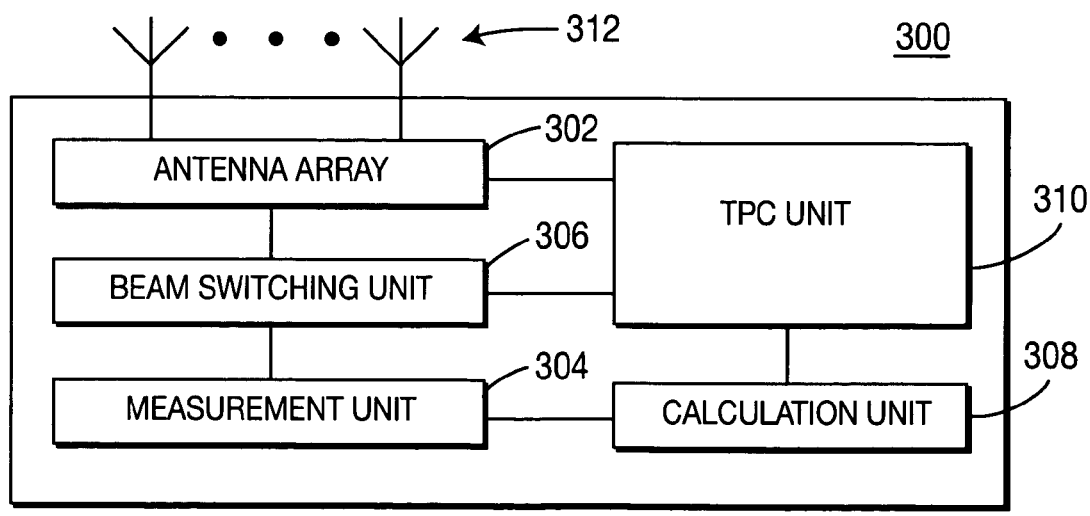
FIG. 3 is a block diagram of an apparatus configured to control a transmit power during beam switching in accordance with the present invention.

FIG. 3 is a block diagram of an apparatus 300 configured to control transmit power during beam switching in accordance with the present invention. The apparatus 300 comprises an antenna array 302, a measurement unit 304, a beam switching unit 306, a calculation unit 308, and a TPC unit 310. The antenna array 302 comprises a plurality of antenna elements 312 for generating a plurality of beams. The beams may be either or both a directional beam and/or an omni-directional pattern. The measurement unit 304 performs physical measurements including a link quality, (such as Eb/Nt, an SIR estimate or an RSSI) on signals received via at least one of the plurality of beams. The beam switching unit 306 switches the beam to a particular direction, whereby a transmission and reception are steered toward a particular beam direction. The beam direction is selected based on the link quality. The TPC unit 310 selects a beam providing a highest link quality. The calculation unit 308 calculates the link quality difference between the link quality of the current beam and the link quality of the selected beam. The TPC unit 310 adjusts TPC parameters in accordance with the link quality difference and, optionally, some other factors.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for transmit power control (TPC) while switching a beam among a plurality of beams in a wireless communication system, the method comprising:
    (a) measuring a link quality on at least one of a plurality of beams;
    (b) selecting a beam having a greatest link quality;
    (c) determining whether the selected beam is different from a current beam, and making a decision for switching a beam if the selected beam is different from the current beam, otherwise repeating the steps (a) and (b);
    (d) calculating a link quality difference between the link quality of the current beam and the link quality of the selected beam; and
    (e) switching a beam from the current beam to the selected beam while adjusting TPC parameters in accordance with the link quality difference.

2. The method of claim 1 wherein the TPC parameter is a transmit power of the selected beam.

3. The method of claim 1 wherein the TPC parameter is adjusted further considering a confidence level of the measurements.

4. The method of claim 1 wherein the TPC parameter is adjusted further considering a change of channel condition.

5. The method of claim 1 wherein the TPC parameter is adjusted further considering desired quality of service (QoS).

6. The method of claim 1 wherein the link quality is one of signal-to-interference ratio, Eb/Nt, and received signal strength indicator.

7. The method of claim 1 wherein the TPC parameter is an accumulated link quality measurement which is reset when the beam is switched.

8. The method of claim 1 wherein the TPC parameter is a link quality target.

9. The method of claim 1 wherein the TPC parameter is a long term QoS.

10. An apparatus for transmit power control (TPC) while switching a beam among a plurality of beams, the apparatus comprising:
    an antenna array for generating a plurality of beams;
    a measurement unit for measuring a link quality on at least one of the plurality of beams;
    a beam switching unit for switching a selected beam after selecting a beam having a greatest link quality;
    a calculation unit for calculating a link quality difference between the link quality of a current beam and the link quality of the selected beam; and
    a TPC unit for adjusting TPC parameters in accordance with the link quality difference.

11. The apparatus of claim 10 wherein the TPC parameter is a transmit power of the selected beam.

12. The apparatus of claim 10 wherein the TPC parameter is adjusted further considering a confidence level of the measurements.

13. The apparatus of claim 10 wherein the TPC parameter is adjusted further considering a change of channel condition.

14. The apparatus of claim 10 wherein the TPC parameter is adjusted further considering desired quality of service (QoS).

15. The apparatus of claim 10 wherein the TPC parameter is an accumulated link quality measurement which is reset when the beam is switched.

16. The apparatus of claim 10 wherein the link quality is one of signal-to-interference ratio, Eb/Nt, received signal strength indicator.

17. The apparatus of claim 10 wherein the TPC parameter is a link quality target.

18. The apparatus of claim 10 wherein the TPC parameter is a long term QoS.

* * * * *